United States Patent [19]

Herscovici et al.

[11] Patent Number: 4,565,853
[45] Date of Patent: Jan. 21, 1986

[54] COMPOSITIONS FOR FORMING EPOXY ADHESIVE CONTAINING ACRYLATE RUBBER

[75] Inventors: Eva J. Herscovici, Chappaqua; Ki-Soo Kim, Katonah, both of N.Y.

[73] Assignee: Stauffer Chemical Company, Westport, Conn.

[21] Appl. No.: 459,071

[22] Filed: Jan. 19, 1983

[51] Int. Cl.$^4$ .................. C08L 13/00; C08L 51/08; C08L 63/00
[52] U.S. Cl. .................................... 525/530; 525/107
[58] Field of Search .......................................... 525/530

[56] References Cited

U.S. PATENT DOCUMENTS

| 4,028,432 | 6/1977 | Dawans et al. | |
|---|---|---|---|
| 4,051,193 | 9/1977 | McWhorter | |
| 4,119,592 | 10/1978 | Murphy | 525/530 |
| 4,129,670 | 12/1978 | Riew | 525/530 |
| 4,146,452 | 3/1979 | Weber et al. | 525/530 |
| 4,308,185 | 12/1981 | Evans et al. | 525/530 |

FOREIGN PATENT DOCUMENTS

| 52-41663 | 3/1977 | Japan | 525/530 |
|---|---|---|---|
| 57236 | 5/1978 | Japan | |
| 2068001A | 8/1981 | United Kingdom | 525/530 |

OTHER PUBLICATIONS

Chemical Abstracts: 64497x, "Radioselling Epoxy Resins", (1973).
Mark et al., "Elastomers and Rubber Elasticity", ACS Symposium Series, pp. 10–12, Aug. 1981.

Primary Examiner—Allan M. Lieberman
Attorney, Agent, or Firm—Richard P. Fennelly

[57] ABSTRACT

Reaction mixtures for forming curable epoxy resin compositions comprise an epoxy resin, a monoethylenically unsaturated monomer capable of forming polyacrylate rubber, a chain transfer agent to allow for higher levels of rubber in the curable epoxy resin without undesired viscosity increase and/or gellation, and a monomer soluble initiator. Optional ingredients include a crosslinking agent for the rubber-forming monomer, a grafting agent for rubber and epoxy resin, and an epoxy curing agent, preferably having activation conditions which are not satisfied when the initiator is activated. Heating the reaction mixture gives epoxy resin compositions containing polyacrylate rubber, the latter being optionally crosslinked and/or grafted to the epoxy resin. Activation of the curing agent, e.g., by heating, when such curing agent is present, yields cured adhesive compositions.

16 Claims, No Drawings

COMPOSITIONS FOR FORMING EPOXY ADHESIVE CONTAINING ACRYLATE RUBBER

BACKGROUND OF THE INVENTION

1. Field of the Invention

The present invention relates to compositions for forming epoxy adhesive compositions containing acrylate rubber and to the compositions thus produced.

2. Description of the Prior Art

Various epoxy resin compositions that do not contain an acrylate rubber as a modifier are known to the prior art. For example, acrylic acid is suggested as a curing agent for epoxy resins in Rev. Gen. Caout. Plast., 1973 50(11), 890–892. More recently, U.S. Pat. No. 4,028,432 to F. Dawans has taught the use of polybutadiene having carboxylic substitution as a modifier for a liquid epoxide resin.

The polymerization of a major amount of an alkyl methacrylate monomer, e.g., 2-ethylhexyl methacrylate, in the presence of a minor amount of an epoxy resin to form adhesive compositions is shown in Japanese Kokai No. 78/57,237.

More recently, U.S. Pat. No. 4,051,195 to W. F. McWhorter suggested blending epoxide resin and a polyacrylate or polymethacrylate ester of a polyol which contained more than one terminal acrylate or methacrylate group. This blend could then be cured using conventional epoxy resin crosslinking agents. The compositions shown in this patent do not contain a monomer soluble initiator capable of reacting with a monoethylenically unsaturated alkyl acrylate or methacrylate to form an acrylate rubber moiety. In the McWhorter compositions, the curing agent first reacts with the epoxy groups to form substituted amine and hydroxy groups. The thus formed amine will then react with the acrylate double bond. The result is the formation of substituted amine groups and saturated carbon to carbon linkages.

More recently, in copending U.S. patent application Ser. No. 316,469, filed Oct. 30, 1981, now abandoned, it has been suggested to modify epoxy resin with a lesser amount of a polyacrylate rubber by forming a reaction mixture comprising epoxy resin, acrylate or methacrylate monomer, and initiator and polymerizing it to form the polyacrylate rubber-modified epoxy resin. In such a system, however, use of more than about 20–25 parts by weight of monomer per hundred parts by weight of epoxy resin was found to undesirably increase the viscosity of the resulting product so as to cause gellation in many cases. Such a result precluded the normally desired flowability at room temperature which was needed for the adhesive composition.

SUMMARY OF THE PRESENT INVENTION

The present invention relates to an improvement of the acrylate-modified epoxy resin described above wherein an effective amount of a chain transfer agent for the acrylate and/or methacrylate monomer is incorporated in the reaction mixture to allow for higher amounts of acrylate rubber to be incorporated into the final epoxy resin while producing a flowable resin having a much lower viscosity than obtainable if the chain transfer agent were not used.

DESCRIPTION OF THE PREFERRED EMBODIMENTS

One important constituent present in the reaction mixture described earlier which is used to form the curable adhesive compositions of the present invention is an epoxide resin such as conventionally used in the art to formulate epoxide adhesives. Generally, the reaction mixture and resulting polyacrylate-modified epoxide compositions can contain from about 40% to about 99%, by weight, of the epoxide resin, preferably from about 65% to about 95%, by weight.

The epoxide resins useful in this invention are those resins which contain more than one 1,2-epoxy group per molecule. They can be saturated or unsaturated, aliphatic, cycloaliphatic or heterocyclic and can be monomeric or polymeric in nature. The weight per epoxide of such resins can be within the range of about 100 to about 2,000. Preferably, the epoxide resins will contain glycidyl ether or ester groups, will be liquid rather than solid, and will have weight per epoxide in the range of about 110 to about 500, most preferably about 175 to about 250.

Useful epoxide resins are the glycidyl polyethers of polyhydric phenols which are derived from an epihalohydrin, e.g., epichlorohydrin, and a polyhydric phenol. Examples of such polyhydric phenols include resorcinol, hydroquinone, bis(4-hydroxyphenyl)-2,2-propane, or bisphenol A as it is commonly called, 4,4'-dihydroxybenzophenone, bis(4-hydroxyphenyl)-1,1-ethane, bis(4-hydroxyphenyl)-1,1-isobutane, bis(4-hydroxyphenyl)2,2-butane, bis(2-dihydroxynaphtyl) methane, phloroglucinol, and bis(4-hydroxyphenyl) sulphone. Additional polyhydric phenols are novolac resins containing more than two phenol, or substituted phenol, moieties linked through methylene bridges as well as halogenated, e.g., brominated and chlorinated, phenolic compounds.

Additional epoxide resins are glycidyl polyethers of polyhydric alcohols prepared by reacting a polyhydric alcohol with an epihalohydrin using an acidic catalyst, e.g., boron trifluoride, and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanediol, hexanetriol, trimethylol propane, trimethylol ethane, pentaerythritol and the like.

Other epoxide resins are glycidyl esters of polycarboxylic acids which are derived from an epihalohydrin and a polycarboxylic acid. Examples of polycarboxylic acids include phthalic acid or its anhydride, isophthalic acid, terephthalic acid, tetrahydrophthalic acid, hexahydrophthalic anhydride, adipic acid, dimerized fatty acids, dibasic acids made from an unsaturated fatty acid and acrylic acid, and the like.

The most preferred epoxide resins are glycidyl polyethers or polyhydric phenols, particularly the glycidyl polyether of bisphenol A.

The reaction mixture used to form the curable epoxy-polyacrylate rubber modified compositions of this invention also contains a suitable amount of an alkyl acrylate or alkyl methacrylate monomer (or mixtures thereof) capable of forming a rubbery particle having a Tg of less than about 40° C. The amount of such monomer can range from about 1% to about 60%, by weight of the final modified epoxide resin, preferably about 10% to about 35%, by weight. Representative monomers which can be selected for use are the unsubstituted and substituted $C_1$ to $C_{20}$ alkyl acrylates and alkyl methacrylates and include n-butyl acrylate, ethyl acrylate, 2-hydroxyethyl acrylate, 2-ethylhexyl acrylate, 2-butyl methacrylate,, 2-ethylhexyl methacrylate, and decyl methacrylate.

The resulting curable epoxy-polyacrylate rubber modified composition contains a similar amount of epoxy resin and a similar amount of polyacrylate rubber derived from the aforesaid acrylate and/or methacrylate monomers.

The reaction mixture can also contain an optional crosslinking agent for the acrylate and/or methacrylate monomer component as well as an optional grafting agent for the polyacrylate rubber and epoxy.

The crosslinking agent for the rubber-forming monomer, or monomers, can be a polyethylenically unsaturated crosslinking monomer such as conventionally employed to form crosslinked acrylate and/or methacrylate rubber polymers. It can be present at from about 0.01% to about 10% by weight of the monomers forming the rubber. Representative crosslinking agents, which contain at least two ethylenically unsaturated groups, include such compounds as allyl methacrylate, divinyl benzene, diethylene glycol dimethacrylate, ethylene glycol dimethacrylate, trimethylolpropane trimethacrylate, methylene-bis-acrylamine, diethylene glycol diacrylate, ethylene glycol diacrylate, divinyl ether, diallyl fumarate, diallyl phthalate, divinyl sulfone, divinyl carbitol, triethylene glycol dimethacrylate, trimethylene glycol diacrylate, butylene glycol diacrylate, pentamethylene glycol diacrylate, glyceryl triacrylate, octylene glycol diacrylate, trimethylene propane triacrylate, the tetraacrylate ester of pentaerythritol, and various diallyl phosphonates.

The grafting agent can be a difunctional monomer containing a vinyl group and an epoxy reactive functional group (e.g., a carboxy group) or containing a vinyl group and an epoxy group. Examples of suitable grafting agents include ethylenically unsaturated carboxylic acids (e.g., the $C_2$–$C_{10}$ alkenyl carboxylic acids) as well as the glycidyl esters of those acids. Representative compounds include acrylic acid, methacrylic acid and glycidyl methacrylate. These grafting agents can be present at from about 0.1% to about 20%, by weight of the monomers forming the polyacrylate rubber.

In accordance with the present invention, an effective amount of a chain transfer agent for the acrylate is also contained in the reaction mixture to allow for the presence of higher amounts of the polyacrylate rubber in the final epoxy composition without causing undesired viscosity increase and/or gellation. Generally, the amount of chain transfer agent which is used can range from about 0.001% to about 15%, by weight of the acrylate and/or methacrylate monomer used to form the rubber. Preferably, the amount of chain transfer agent ranges from about 0.1% to about 10%, by weight of the acrylate and/or methacrylate.

The chain transfer agent which is used in regard to the present invention is one which is effective in chain transfer of acrylate and/or methacrylate polymerizations conducted in liquid epoxy resin media. Such compounds are substantially devoid of active hydrogen atoms which would react with the epoxy resin to cure it. Representative chain transfer agents of this type which are suitable for use in the present invention include hydrocarbon chain transfer agents (e.g., dipentene, cumene, toluene and cyclohexene), halogenated chain transfer agents (e.g., bromoform, chloroform, bromotrichloromethane, and dichlorodibromomethane), nitrogen chain transfer agents (e.g., N,N-dimethylaniline, the nitrobenzenes, and trinitrobutane), sulfur chain transfer agents (e.g., thiophenol, thionaphthol, and thioglycolic acid), organometallic chain transfer agents (e.g., diethyl zinc and tetraethylsilane) and such miscellaneous chain transfer agents as p-benzoquinone and pyrogallol. The halogenated aliphatic compounds are preferred for use as the chain transfer agent.

The presence of the chain transfer agent allows for the presence of higher amounts of polyacrylate rubber in the modified epoxy resin composition with a lower viscosity (hence less chance of gellation) than would otherwise be possible. It also gives a composition having better adhesive properties (e.g., T-peel adhesion and tensile shear) in certain embodiments.

In order to form the curable epoxy modified with polyacrylate rubber of the present invention, the epoxy resin, rubber-forming monomer, chain transfer agent (optionally with either or both of crosslinking and grafting agent) are polymerized in the presence of a catalytically effective amount of a monomer-soluble initiator, (e.g., 0.01% to 10%, by weight of rubber-forming monomer) at a temperature (e.g., 10 to 150° C.) and for a length of time (e.g., 0.1 to 50 hours) to achieve formation of the rubber in the epoxy composition. Representative initiators include the azo initiators (e.g., azobisisobutyronitrile), the peroxide initiators (e.g., lauroyl or benzoyl peroxide), or the peroxydicarbonate initiators (e.g., isopropylperoxy dicarbonate). If crosslinking agent is also present, the initiator will produce a crosslinked polyacrylate rubber. Presence of grafting agent will produce grafting of the polyacrylate rubber and epoxy resin.

The epoxy resin composition containing polyacrylate rubber finds utility as one component in a curable system. The other major component of such a system is a curing agent for the epoxy resin and it can be present at from about 99% to about 1%, by weight of the system. Representative curing agents include aliphatic polyamines having at least 3 active amine hydrogen atoms per molecule. Examples of such amines are the polyalkylene polyamines, e.g., diethylene triamine, triethylene tetraamine, tetraethylene pentamine and pentaethylene hexamine. Additional useful amines are ethylene diamine, tetramethylene diamine, hexamethylene diamine, xylene diamine, and the like. Adducts of such amines with acrylonitrile, acrylic acid, ethyl acrylate and the like are also useful if the adduct contains at least three active amine hydrogen atoms. Also included as useful amines are amidoamines obtained by reacting polyamines with fatty acids, both monomers and dimers, provided of course that the resulting amidoamine contains at least 3 active amine hydrogen atoms per molecule.

Additional curing agents which can be used with the compositions of this invention include the amine terminated polyamides, aromatic amines, mercaptans, anhydrides, isocyanates, and catalyst/latent hardeners such as boron trifluoride-monoethylamine and dicyandiamide.

If desired, the curing agent could, under certain circumstances, be used in the original reaction mixture containing epoxy resin, acrylate and/or methacrylate rubber-forming monomer, and initiator. If the ultimate user of the cured adhesive immediately employs the reaction mixture, heating of it will both form the rubber via action of the initiator and will also cure the adhesive via action of the curing agent. If a curable system is desired, however, the initiator will have to be selected so that it has activation conditions which are not satisfied when the initiator is activated to form the rubber. In this way, the reaction mixture can be heated, for example, to only form the rubber component (optionally crosslinked and/or grafted) with the curing agent remaining in a latent state until activated at a later time, e.g., by being heated to a higher temperature.

The curable compositions, or reaction mixture to form it, of the instant invention can be compounded with various fillers, reinforcing agents, dyes, pigments and other additives depending upon the ultimate end use and desired properties. The compositions can also be dissolved in and used from solvents, e.g., aromatic hydrocarbons, ethers, ether-esters, ether-alcohols, esters, alcohols, ketones and the like. However, these compositions can be used with no solvents, i.e., at 100% solids.

The curing reaction, if desired, can be accelerated by heating, e.g., to a temperature of up to 300° C., depending upon curing agent.

The following Examples illustrate certain preferred embodiments of the present invention.

COMPARATIVE EXAMPLE 1

Into a 500 ml. round bottom, four neck flask equipped with mechanical stirrer, reflux condenser, thermometer, gas inlet tube and heating mantle controlled by a thermowatch was charged 250 gm. of the diglycidyl ether of bisphenol A (EPON 828 brand from Sheel Chemical Co.). This liquid polyepoxide was purged with nitrogen below its surface for about 30 minutes, the gas inlet tube was removed from the liquid and nitrogen was passed through the flask above the liquid level. Then, the following were added to the liquid polyepoxide at the same time: 25 gm. of butyl acrylate (BuA); 1.25 gm. of acrylic acid (AA); 0.125 gm. of diethylene glycol diacrylate (DEDA), and 0.5 gm. of benzoyl peroxide (BP). The temperature was raised to about 85° C., and the mixture was stirred at 85°-87° C. for eighteen hours. At this time was added one drop (about 20 mg.) of tri(C-8-C10)methyl ammonium chloride catalyst (ADOGEN 464 brand from Sherex Chemical Co.) hereinafter abbreviated "Ad". The temperature was raised to 115° C. and maintained at that temperature with stirring for four hours. The resulting 10 phr acrylate-modified epoxy prepolymer thereby produced was clear and had a Brookfield viscosity of 74,000 cps at 25° C.

COMPARATIVE EXAMPLE 2

The procedure used in this Examples was the same used in Comparative Example 1 with the exception that the solution added to the polyepoxide consisted of 37.5 gm. of BuA, 1.88 gm. of AA, 1.9 gm. of DEDA, and 0.75 gm. of BP. The resulting 15 phr acrylate-rubber-modified prepolymer was clear and had a Brookfield viscosity of 250,000 cps at 25° C.

EXAMPLE 3

This Example illustrates the effect that a bromotrichloromethane ($CBrCl_3$) chain transfer agent has on the product made from Comparative Example 2.

The process of Comparative Example 2 was repeated with the exception that 0.75 gm. of bromotrichloromethane chain transfer agent was present in the acrylate solution that was added to the polyepoxide. The resulting prepolymer was clear and had a substantially lower viscosity (i.e., 73,000 cps at 25° C.) than the prepolymer of Comparative Example 2.

Table 1 presents similar examples of 15 phr acrylate-modified epoxy prepolymers that were obtained using the same general process:

TABLE 1

| Run No. | $CBrCl_3$ % of BuA | Brookfield Viscosity cps at 25° C. | Appearance |
| --- | --- | --- | --- |
| 1* | 0 | 180,000 | Clear |
| 2 | 4 | 52,000 | Clear |
| 3 | 6 | 39,000 | Clear |
| 4 | 10 | 34,000 | Clear |
| 5 | 15 | 28,000 | Clear |

*not part of the present invention, but merely set forth as a control.

The above data illustrate that the viscosity of the prepolymer is decreased as the amount of chain transfer agent is increased.

COMPARATIVE EXAMPLE 4

The same procedure used in Comparative Example 1 was employed with the exception the acrylate solution added to the polyepoxide consisted of: 75 gm. BuA, 1.87 gm. AA, 0.375 gm. DEDA, and 1.5 gm. BP to give a 30 phr acrylate rubber-containing epoxy prepolymer. A strong exotherm raised the reaction temperature to 120° C. within minutes after reaching 85° C. It was cooled rapidly to 85° C. and maintained at 85° C. The prepolymer was a gel when the reaction finished.

EXAMPLE 5

The same procedure used in Comparative Example 4 was utilized with the exception that 7.5 gm. of $CBrCl_3$ chain transfer agent (10% of BuA) was added to the acrylate solution. The resulting clear prepolymer had a Brookfield viscosity of 28,000 cps at 25° C.

EXAMPLE 6

This Example was similar in procedure to Example 5 with the exception that 200 gm. of polyepoxide (EPON 828 brand) was used along with an acrylate solution containing 80 gm. BuA, 1.5 gm. AA, 0.4 gm. DEDA, 1.6 gm. $CBrCl_3$ (2% of BuA) and 1.6 gm. BP to give a 40 phr acrylate rubber-modified epoxy prepolymer. The maximum temperature reached due to exotherm was 108° C. The prepolymer was clear and had a viscosity of 90,000 cps at 25° C.

Table 2 shows similar examples of 40 phr acrylatemodified epoxy prepolymer using various levels of $CBrCl_3$ chain transfer agent:

TABLE 2

| Run No. | $CBrCl_3$ % of BuA | Brookfield Viscosity (cps at 25° C.) | Max. Exotherm Temp. (°C.) | Appearance |
| --- | --- | --- | --- | --- |
| 1 | 2 | 108,000 | 125 | Clear |
| 2 | 4 | 60,000 | 100 | Clear |

EXAMPLE 7

This run was similar to that of the previous Example but used 200 gm. polyepoxide (EPON 828 brand) with the acrylate solution containing 100 gm BuA, 1.5 gm. AA, 0.5 gm. DEDA, 2 gm $CBrCl_3$ (2% of BuA), and 2 gm. BP to give a 50 phr acrylate-modified epoxy clear prepolymer having a Brookfield viscosity of 47,000 cps at 25° C.

Table 3 shows other examples of 50 phr acrylate rubber-containing epoxy prepolymers using differing percentages of $CBrCl_3$ chain transfer agents:

TABLE 3

| Run No. | $CBrCl_3$ % of BuA | Brookfield Viscosity Cps at 25° C. | Appearance |
| --- | --- | --- | --- |
| 1 | 4 | 43,000 | Clear |
| 2 | 10 | 28,000 | Clear |

COMPARATIVE EXAMPLE 8

In this Example the procedure was slightly modified so that the acrylate solution was added slowly to the polyepoxide resin to avoid exotherm and control the reaction temperature.

A 2000 ml. flask equipped with mechanical stirrer, reflux condenser, thermometer, gas inlet tube, addition funnel and heating mantle controlled by a thermowatch was charged with 1000 gm. polyepoxide (EPON 828 brand) and purged with nitrogen for 30 minutes at 85° C. below the liquid surface. The gas tube was then removed from the liquid and nitrogen was passed through the flask above the liquid level. In a separate flask a solution was prepared which consisted of 150 gm. BuA, 7.5 gm. AA, 0.75 gm. DEDA, and 2.25 gm. BP. This solution was added to the polyepoxide slowly via the addition funnel while stirring the resulting mixture and holding the temperature at 84°–87° C. The time of addition was 55 minutes After eighteen hours, 40 mg. of tri($C_8$–$C_{10}$) methyl ammonium chloride catalyst (ADOGEN 464 brand) was added, the temperature was raised to 115° C. for 4 hours. A clear 15 phr acrylate rubber-containing prepolymer was obtained having a Brookfield viscosity of 250,000 cps at 25° C.

EXAMPLE 9

The procedure used in this Example is similar to the one used in Comparative Example 8 with the exception that 1.5 gm $CBrCl_3$ (1% of BuA) was also present in the acrylate solution. A clear prepolymer was obtained having a Brookfield viscosity of 85,500 cps at 25° C.

EXAMPLE 10

The procedure used was the same as that used in Example 9 with the exception of use of 0.6 gm. of $CBrCl_3$ chain transfer agent (0.4% of BuA) to yield a clear prepolymer with a Brookfield viscosity of 128,000 cps at 25° C.

EXAMPLE 11

This Example was generally similar to the ones just preceding but was run in a 500 ml. flask and employed 200 gm. of polyepoxide (EPON 828 brand). The acrylate solution contained 100 gm. of BuA, 1.5 gm. of AA, 0.5 gm. DEDA, 1.5 gm. BP and 2 gm. of $CBrCl_3$ chain transfer agent (2% of BuA). The resulting 50 phr acrulate rubber-containing clear prepolymer had a Brookfield viscosity of 150,000 cps at 25° C.

COMPARATIVE EXAMPLE 12

The Example was similar to Comparative Example 8, except the benzoyl peroxide was added to the polyepoxide before the addition of the acrylate solution, and the polymerization time was reduced to 5.5 hours. The apparatus used was a 500 ml. flask equipped as in Comparative Example 8. The polyepoxide (250 gm. of EPON 828 brand) was charged into the flask, it was purged with nitrogen for 30 minutes at 85° C., 0.56 gm. of BP was added and allowed to dissolve 2–3 minutes. Then, an acrylate solution of 37.5 bm. BuA, 1.88 gm. AA and 0.19 gm. DEDA was added via addition funnel over a period of 80 minutes. After 5.5 hours was added one drop (25 mg.) of tri($C_8$–$C_{10}$)methyl ammonium chloride catalyst (ADOGEN 464) and the mixture was heated to 115° C. for four hours. The resulting 15 phr acrylate rubber-containing epoxy prepolymer was clear and had a Brookfield viscosity of 177,000 cps at 25° C.

EXAMPLE 13

The procedure used was the same as in the preceding Example with the exception that 200 gm. of polyepoxide (EPON 828 brand), 1.5 gm. BP, 100 gm. BuA, 0.5 gm. DEDA, and 2 gm. $CBrCl_3$ chain transfer agent (2% of BuA) were used. The resulting 50 phr acrylate-containing polyepoxide prepolymer was clear and had a Brookfield viscosity of 106,000 cps at 25° C.

EXAMPLE 14

This Example was similar to the one shown in Example 13 but used 4 gm. $CBrCl_3$ chain transfer agent (4% of BuA) to yield a 50 phr acrylate-containing prepolymer with a Brookfield viscosity of 38,000 cps. at 25° C.

EXAMPLE 15

This Example is similar to Example 14 using a 2000 ml. flask equipped as in that Example. To the flask were charged 300 gm. of polyepoxide (EPON 828 brand), 5.4 gm. BP and an acrylate solution of 360 gm. BuA, 5.4 gm. AA, 1.8 gm. DEDA, and 21.5 gm. $CBrCl_3$ chain transfer agent (6% of BuA). A 120 phr acrylate rubber-containing polyepoxy prepolymer was obtained which was clear and which had a Brookfield viscosity of 42,000 cps at 25° C. The addition time was 130 minutes.

EXAMPLE 16

The same procedure used in Comparative Example 8 was employed with the exception that 0.75 gm. of 1,2-dibromo-1,1-dichloroethane ($C_2H_2Br_2Cl_2$) chain transfer agent (2% of BuA) was also employed in the acrylate solution. A clear, 15 phr acrylate rubber modified epoxy prepolymer was obtained having a Brookfield viscosity of 66,000 cps at 25° C.

The Table given below presents similar examples of 15 phr acrylate-modified epoxy prepolymers that were obtained by the same general process with the use of other chain transfer agents at the 2% level based on the weight of butyl acrylate:

TABLE 4

| Sample No. | Chain Transfer Agent | Brookfield Viscosity (cps at 25° C.) | Appearance |
| --- | --- | --- | --- |
| 1* | Diethyl phosphite | Paste | Cloudy |
| 2 | Cyclohexene | 140,000 | Clear |
| 3 | Dipentene | 70,000 | Clear |
| 4* | Triphenyl phosphine | No polymerization | |

*comparative runs, not part of the present invention.

EXAMPLE 17

This Example was similar to Example 16 but used 0.375 gm. of $C_2H_2Br_2Cl_2$ chain transfer agent (1% of BuA) to give a clear epoxy prepolymer having a Brookfield viscosity of 92,000 cps at 25° C.

EXAMPLE 18

Certain 15 phr acrylate rubber-containing prepolymers were evaluated for adhesiveness when cured with triethylenetetramine for 30 minutes at 150° C. Some of the 50 phr acrylate-containing adhesives were diluted to 15 phr with polyepoxide (EPON 828 brand) prior to the evaluation. Table 5 shows the samples which were evaluated and the adhesive properties noted:

TABLE 5

| Product from Ex. No. | $CBrCl_3$ % of BuA | Brookfield Viscosity (cps at 25° C.) | T-Peel* (kg/cm width) | Tensile Shear** (kg/cm$^2$) |
| --- | --- | --- | --- | --- |
| Ex. 3, Run 1 | 0 | 180,000 | 1.4 | 218 |
| Ex. 3 | 2 | 73,000 | 2.0 | 225 |
| Ex. 3, Run 2 | 4 | 52,000 | 2.1 | 246.1 |

*the test procedure used is described in ASTM D-1876-72 and represents the relative peel resistance of adhesive bonds between flexible adherents.
**the test procedure used is described in ASTM D-1002-72 and represents the comparative shear strength of adhesives for bonding metals.

These data illustrate that increasing the level of chain transfer agent decreases the viscosity and increases the T-peel strength and shear tensile strength of the cured epoxy prepolymer compositions. For comparison, the viscosity of non-acrylate modified polyepoxide (i.e., EPON 828 brand) is 15,500 cps at 25° C. and the polyepoxide has significantly lower values for T-Peel (0.4 kg/cm. width) and shear tensile strength (133.6 kg/cm.$^2$).

The foregoing Examples merely represent certain embodiments of the present invention and should not be construed in a limiting sense. The scope of protection sought is set forth in the claims which follow.

What is claimed:

1. A reaction mixture, for forming a curable epoxy resin composition containing a polyacrylate rubber which comprises an epoxy resin, a monoethylenically unsaturated monomer capable of forming a polyacrylate rubber, an effective amount of a chain transfer agent for the unsaturated monomer to allow for an increased rubber content in the epoxy rubber composition, and a monomer soluble initiator for forming the rubber from the monomer.

2. A mixture as claimed in claim 1 wherein the epoxy resin comprises from about 40% to about 99%, by weight of the composition and the monomer comprises from about 1% to about 60%, by weight of the mixture.

3. A mixture as claimed in claim 2 wherein the initiator comprises from about 0.01% to about 1%, by weight of the mixture.

4. A mixture as claimed in claim 1 which also contains a crosslinking agent for the rubber-forming monomer.

5. A mixture as claimed in claim 1 which also contains a grafting agent for the polyacrylate rubber and epoxy resin.

6. A mixture as claimed in claim 1 wherein the chain transfer agent is a compound substantially devoid of active hydrogen atoms that would cure the epoxy resin.

7. A mixture as claimed in claim 1 wherein the chain transfer agent is present at from about 0.001 to about 15% by weight of the rubber-forming monomer.

8. A mixture as claimed in claim 2 wherein the chain transfer agent is present at from about 0.1% to about 10% by weight of the rubber-forming monomer.

9. A mixture as claimed in claim 1 wherein the chain transfer agent is selected from the group consisting of hydrocarbon, halogenated, nitrogen, sulfur and organometallic chain transfer agents.

10. A mixture as claimed in claim 8 wherein the chain transfer agent is a halogenated aliphatic compound.

11. A polyacrylate-modified epoxy resin composition formed from the mixture of claim 1.

12. A polyacrylate-modified epoxy resin composition formed from the mixture of claim 3.

13. A polyacrylate-modified epoxy resin composition formed from the mixture of claim 8.

14. A cured epoxy resin adhesive formed from the composition of claim 11.

15. A cured epoxy resin adhesive formed from the composition of claim 12.

16. A cured epoxy resin adhesive formed from the composition of claim 13.

* * * * *

UNITED STATES PATENT AND TRADEMARK OFFICE
CERTIFICATE OF CORRECTION

PATENT NO. : 4,565,853
DATED : January 21, 1986
INVENTOR(S) : E. Herscovici

It is certified that error appears in the above—identified patent and that said Letters Patent is hereby corrected as shown below:

Col. 3, line 5, "methacrylate,," should read -- methacrylate, --;

Col. 5, line 40, "(DEDA)," should read -- (DEDA); --;

Col. 5, line 53, "Examples" should read -- Example --;

Col. 7, line 9, "Cps" in the heading should read -- cps --;

Col. 7, lines 59-60, "acrulate" should read -- acrylate --;

Col. 8, line 4, "bm." should read -- gm. --; and

Col. 8, line 7, "tri($C_8$-$C_{10}$)methyl" should read
--tri($C_8$-$C_{10}$)methyl --.

Signed and Sealed this

Tenth Day of June 1986

[SEAL]

Attest:

DONALD J. QUIGG

Attesting Officer

Commissioner of Patents and Trademarks